INVENTOR.
GEORGE A. OLIVE
BY
Charles H. Brown
ATTORNEY

INVENTOR.
GEORGE A. OLIVE
BY Charles H. Brown
ATTORNEY

United States Patent Office
2,944,228
Patented July 5, 1960

2,944,228

SIDEBAND TRANSMITTER WITH PHASE AND AMPLITUDE MODULATION COMPONENTS AMPLIFIED OVER SEPARATE PATHS

George A. Olive, Lawrenceville, N.J., assignor to Radio Corporation of America, a corporation of Delaware Filed May 31, 1957, Ser. No. 662,845
25 Claims. (Cl. 332—45)

The invention relates to transmitters and particularly to single sideband transmitters, and the method of operation thereof.

In comparing single sideband suppressed carrier systems and double sideband systems, a gain in signal-to-noise ratio has been reported for single sideband systems over double sideband systems. Single sideband systems have other advantages such as more effective and efficient use of the frequency spectrum.

The intelligence in a single sideband signal or wave is transmitted by varying two properties of the transmitted wave, namely the amplitude and the phase. The phase variations carry a large number of sidebands with distinct bundles of energy. The amplitude modulation determines the total energy given to the entire signal at any instant of time, and also neutralizes some of the sidebands and reinforces others.

A single sideband transmitter has been proposed which eliminates the need for complex and costly equipment such as linear radio frequency amplifiers. A portion of a single sideband wave to be amplified is passed through limiting stages, thereby removing the amplitude modulation component and producing the pure phase modulation component. The original single sideband wave amplitude modulation envelope is detected and the resultant audio frequency wave is amplified. The amplified, detected amplitude modulation envelope then remodulates, in a final stage, the amplified phase modulation component, resulting in an amplified copy of the original single sideband wave. If the phase and amplitude modulation components are recombined in proper phase and with proper amplitudes, the undesired sidebands of the phase and amplitude modulation components will cancel, reproducing the single sideband wave form. A single sideband transmitter of this type is shown and described in United States Patent 2,666,133, issued to L. R. Kahn on January 12, 1954, for Single Sideband Transmitter.

An object of the invention is to provide an improved single sideband transmitter of the type in which the phase and amplitude modulation components of a single sideband wave are amplified over separate paths and then recombined to produce an amplified copy of the original single sideband wave.

Another object is to provide an improved single sideband transmitter for transmitting signal energy in which the amount of energy transmitted is constant over a given period of time, as in tone transmission, or in which the amount of energy transmitted in the given period of time varies, as in voice transmission.

A further object is to provide a novel amplifying system for use in a single sideband transmitter, the amplifying system including equipment which is simpler and less critical in operation than the equipment used in known systems.

Still another object is to clamp the amplitude modulation component of a single sideband suppressed carrier transmitter to a potential which results in zero power output each time a corresponding zero output interval occurs at the single sideband generator supplying intelligence to the transmitter.

Briefly, the objects of the invention are accomplished by a single sideband transmitting system in which a portion of a single sideband wave to be amplified is passed through one or more stages of limiters. The limiters function to eliminate the amplitude modulation component or envelope, producing an output wave including only the phase modulation component of the single sideband wave. The phase modulation component is amplified and fed to a grid-modulated, final amplifier stage. The remaining portion of the single sideband wave is fed to a detector circuit which functions to detect the amplitude modulation component or envelope of the single sideband wave. The detected, amplitude modulation component is passed through one or more A.C. (alternating current) amplifiers, and the amplified, amplitude modulation component is, thereafter, fed to a modulator stage.

The direct current or average amplitude component of the amplitude modulation component is, in effect, not passed by the A.C. amplifiers. The A.C. amplifiers function by the A.C. operation thereof to produce an output wave having a substantially constant average amplitude, whether the direct current component of the amplitude modulation component applied thereto is of a constant level over a given period of time, as in tone transmission, or of a varying level over the given period of time, as in voice transmission. The retention of the direct current component of the amplitude modulation component is particularly important in the transmission of signal energy in which the level of the low frequency or direct current component varies, as in voice transmission. In order to provide a proper amplified copy of the original single sideband wave for transmission, therefor, it is necessary that the direct current component, as included in the amplitude modulation component of the original single sideband wave, be established in the amplified, amplitude modulation component fed to the modulator stage.

In accordance with one embodiment of the invention, the output wave produced by the limiter stages is detected such that a clamping pulse is produced each time the input to the limiters falls below the level of limiting at which time a zero output interval may be said to occur at the output of the limiters. A clamping circuit is arranged to cause the modulator stage to produce a low output upon the reception by the clamping circuit of each of the clamping pulses. In this manner, the amplified, amplitude modulation component including the direct current component of the original single sideband wave is produced at the modulator stage. The amplified, amplitude modulation component is fed from the modulator stage to the grid-modulated, final amplifier stage so as to modulate the amplified phase modulation component, resulting in the production by the final amplifier stage of an amplified copy of the original single sideband wave. A true, amplified copy of the single sideband wave is obtained whether the single sideband transmitter is used to transmit signal energy in which the direct current component is constant over a given period of time, say 0.1 second or more, or is used to transmit signal energy in which the direct current component varies over the given period of time.

A more detailed description of the invention will now be given with reference to the accompanying drawing, in which.

Figure 1:
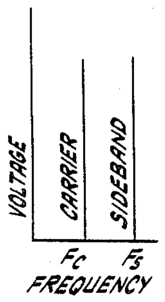
Figures 1 and 2 are diagrams useful in reviewing the characteristics of a single sideband wave.
Figure 2:
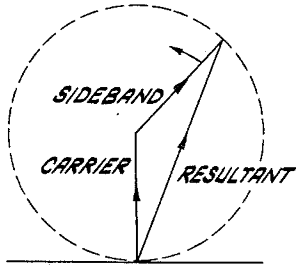

Referring to Figures 1 and 2, it may be helpful to review briefly the characteristics of a single sideband wave. Figure 1 shows the spectral distribution of a single sideband wave having equal carrier and sideband amplitudes. The upper sideband is shown and represents, for example, a signal frequency of 600 cycles, so that the sideband $F_s$ is 600 cycles higher than the carrier $F_c$ on the frequency axis.

Figure 2 is a vector representation of the single sideband wave represented in Figure 1. The carrier frequency is the reference vector. Thus, the sideband vector revolves past the reference vector at a velocity corresponding to the tonal frequency of the signal, which is 600 cycles in the example given. If one considers the resultant of the sideband and carrier vectors, it may be seen that such resultant will vary both in amplitude and angular velocity. Therefore, a single sideband wave has both amplitude and phase modulation components.

Figure 3:
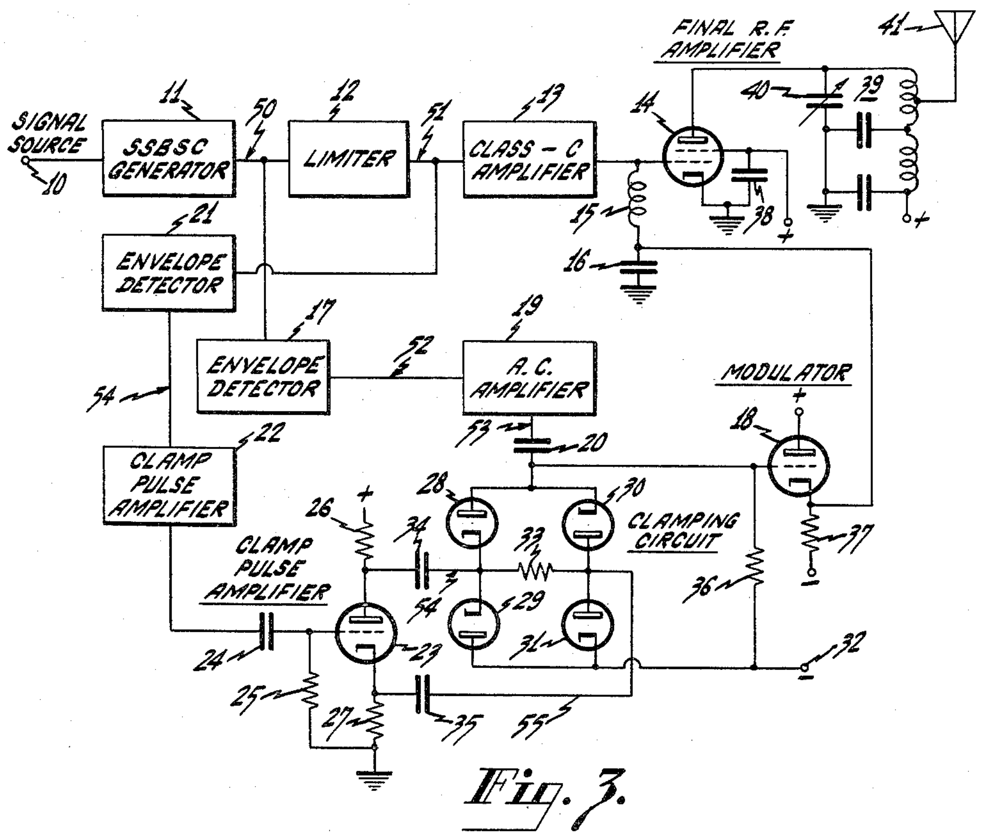
Figure 3 is a circuit diagram of one embodiment of a single sideband transmitter according to the invention.

Referring to Figure 3, modulating signal energy of any desired type is applied via an input terminal 10 to the input of a single sideband generator 11. For example, such modulating signal energy may consist of two or more multiplexed audio tones, each of which is shifted in frequency in accordance with the intelligence in the corresponding multiplex channel. The generator 11 produces single sideband tone frequencies from the input audio tones and may consist of one or more balanced modulators supplied with the audio input tones and with locally-generated wave energy. Bandpass filters are provided for selecting one or the other of the sidebands produced in the modulators. The single sideband generator 11 is designed to produce a selected single sideband wave at the final frequency of the single sideband transmitter. For example, the output frequency of the generator 11 may be in the range of 2–100 mc. (megacycles), plus or minus the audio tone frequencies according to whether the upper or lower sideband is selected.

The single sideband wave output is fed from the generator 11 to two separate paths or channels. One of the channels may be designated as the phase modulation channel and the other channel may be designated as the amplitude modulation channel. The phase modulation channel includes one or more stages of limiters 12 to which is fed a portion of the single sideband wave output of the generator 11. The limiters 12 are of conventional design and may be of the type generally known in the art as overdriven amplifiers in which saturation limiting in plate and grid is employed to produce a rectangular wave from a sine wave. The output wave of the limiters 12 is fed through one or more conventional class C amplifier stages 13 to the grid of the power or final radio frequency amplifiers 14 over an electrical path including a series-connected radio frequency choke 15 and capacitor 16 is connected to ground. The term ground, as used in the specification, is to be understood as referring to a point of fixed or zero alternating current reference potential.

The remaining portion of the single sideband wave output of the generator 11 is fed to the amplitude modulation channel. The amplitude modulation channel includes an envelope detector 17 arranged, for example, as a half-wave diode vacuum tube rectifier. The output wave of the envelope detector 17 is fed to the grid of a modulator stage 18 over an electrical path including one or more conventional, resistance-capacitance or transformer coupled A.C. amplifiers 19 and an output coupling capacitor 20.

In accordance with the invention, a portion of the output wave of the limiters 12 is fed to a second envelope detector 21. The envelope detector 21 may be of the same construction and operation as the envelope detector 17 included in the amplitude modulation channel. The output wave of the envelope detector 21 is fed to a clamp pulse amplifier 22. The pulse output of the amplifier 22 is applied from the amplifier 22 to the grid of a second or final clamp pulse amplifier 23 arranged for class A operation over an electrical path including a capacitor 24 and a grid resistor 25 connected at one end to ground. The plate of the amplifier 23 is connected through a resistor 26 to the positive terminal of a suitable source of potential, and the cathode of amplifier 23 is connected through an unbypassed resistor 27 to ground.

A clamping circuit is provided including four diode rectifiers 28 through 31. Other known unidirectional devices which are arranged to pass current in only one direction may be used in place of the rectifiers 28 through 31. The plate of the diode 28 and the cathode of diode 30 are connected in common to the side of the capacitor 20 connected to the grid of the modulator stage 18 and opposite from that connected to the output of the A.C. amplifiers 19. The plate of the diode 29 and the cathode of the diode 31 are connected in common to the negative terminal 32 of a suitable source of biasing potential. The cathodes of the diodes 28, 29 are connected to one side of a resistor 33, while the plates of the diodes 30, 31 are connected to the other side of the resistor 33. The plate circuit of the amplifier 23 is connected to the cathodes of the diodes 28, 29 over an electrical path including a capacitor 34, and the cathode circuit of the amplifier 23 is connected to the plates of the diodes 30, 31 over an electrical path including a capacitor 35.

The grid of the modulator 18 is connected to the terminal 32 through a resistor 36. The plate of the modulator 18 is connected to the positive terminal of a source of potential, and the cathode is connected through a resistor 37 to the negative terminal of a source of potential. The modulator 18 functions as a cathode follower in that the cathode circuit thereof is connected to the junction of the choke 15 and capacitor 16.

The final radio frequency amplifier 14 includes a cathode connected to ground and a screen grid connected to the positive terminal of a source of potential by-passed to ground by a capacitor 38. The plate of the amplifier 14 is connected to the positive terminal of a source of potential through a tuned resonant circuit 39. The resonant circuit 39 is tuned to the selected single sideband wave by a variable capacitor 40. The high power single sideband wave produced by the amplifier 14 is transmitted by suitable means represented by an antenna 41 coupled to the resonant circuit 39.

Figure 4:
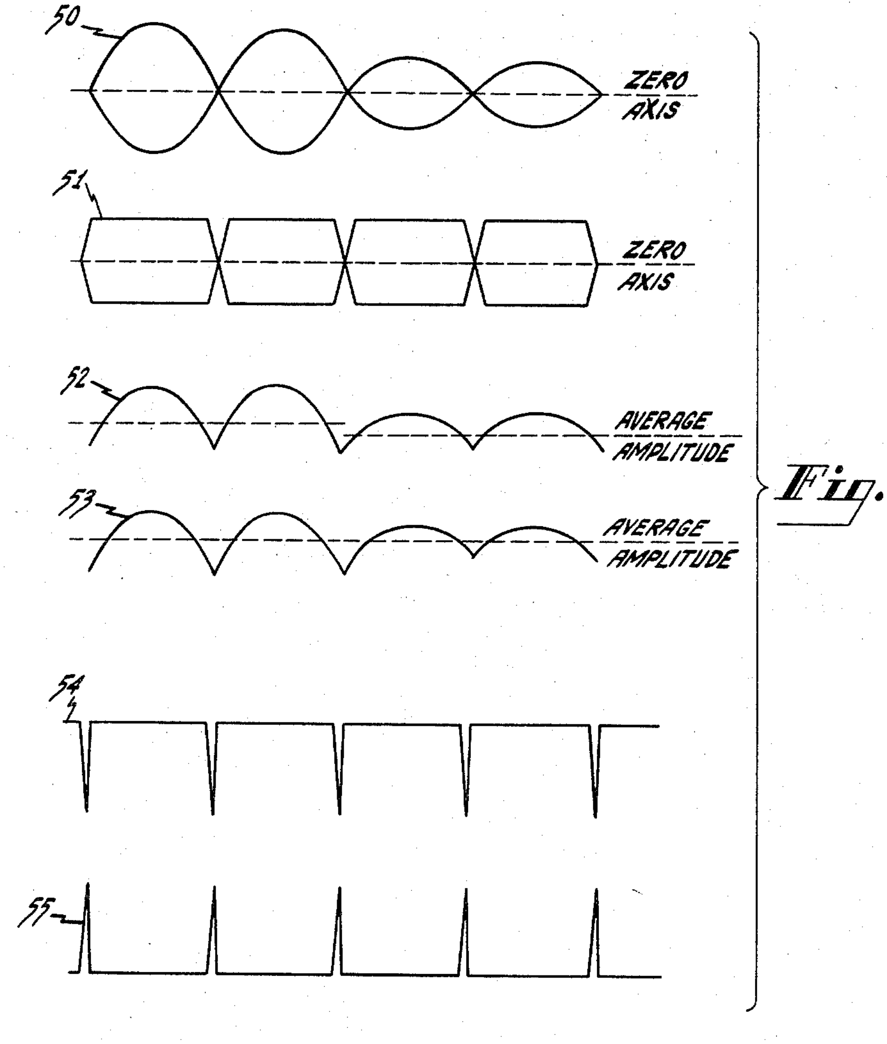
Figure 4 is a series of waveforms useful in describing the circuit diagram given in Figure 3.

In describing the operation of the invention, reference will be made to the various waveforms given in Figure 4. It will be assumed, for purposes of description only, that the generator 11 is arranged to produce a two-tone single sideband suppressed carrier wave. A selected single sideband wave having a waveshape 50, shown in Figure 4, will occur at the output of the generator 11. The single sideband wave will include both phase and amplitude modulation components. A portion of the single sideband wave 50 is fed to the limiters 12. The limiters 12 function in a conventional manner to eliminate the envelope or amplitude modulation component from the single sideband wave 50. The output from the final limiter 12 is of a constant amplitude but its phase is varying with the modulation, as must be the case for the phase modulation component of the single sideband wave. The output of the limiters 12 will resemble the waveshape 51 given in Figure 4, which has been exaggerated in size for the sake of description. The output wave 51 of the limiters 12 is fed to the class C amplifiers 13 which function to amplify the wave 51 the desired amount and to, thereafter, apply the amplified, phase modulation component to the grid of the final amplifier stage 14.

The remaining portion of the single sideband wave 50 appearing at the output of the generator 11 is fed to the envelope detector 17. The detector 17 removes the envelope or amplitude modulation component from the received wave 50, and a wave resembling the waveshape 52, given in Figure 4, and having a form identical to the envelope of the single sideband wave 50, appears at the output of the detector 17 The wave or envelope 52 is fed to the A.C. amplifiers 19 which function to amplify the wave or amplitude modulation component 52 a desired amount. An output wave will appear across the output capacitor 20 having the general waveshape 53 given in Figure 4. The amplifiers 19 tend by A.C. action to average out any variations in the direct current or average amplitude component of the amplitude modulation component 52 applied thereto, and function to produce an output wave 53 having a substantially constant average amplitude. By a comparison of the waveshapes 52, 53, it may be seen that the varying direct current component of the two-tone single sideband wave envelope has been lost by the passage of the envelope 52 through the amplifiers 19. The amplified, amplitude modulation component 53 applied across the capacitor 20 to the grid of the modulator stage 18 is not a copy of the envelope of the original single sideband wave 50.

A portion of the output wave 51 produced by the limiters 12 is fed to the second envelope detector 21. As may be seen by an examination of Figure 4, the waveshape 51 or output of the limiters 12 will have spikes in its envelope corresponding to the periods in which the output of the generator 11 due to the modulation thereof is zero. In the transmission of the two-tone signal, given by way of example, these spikes will occur at regular intervals. The detector 21 functions, in effect, to detect these spikes and to produce a train of negative-going pulses, resembling the waveshape 54 given in Figure 4. The pulses designated as clamp pulses are fed to the amplifier 22 which functions to amplify and to reverse the polarity of the pulses. The train of amplified, positive-going clamp pulses are then fed to the grid of the amplifier 23.

Amplifier 23 is arranged for class A operation and is normally near cutoff. Upon the application of each positive clamp pulse to the grid of amplifier 23, amplifier 23 conducts heavily. A negative-going pulse appears in the plate circuit of the amplifier 23 and is applied to the cathodes of diodes 28, 29 through capacitor 34. At the same time, a positive-going pulse appears in the cathode circuit of the amplifier 23 and is applied to the plates of diodes 30, 31 through capacitor 35. As a result of this action, a series of negative-going pulses resembling the waveshape 54 of Figure 4 will be applied to the cathodes of diodes 28 and 29, while a series of positive-going pulses resembling the wave-shape 55 of Figure 4 will be simultaneously applied to the plates of diodes 30 and 31.

In a manner to be described, the diodes 28 through 31 are normally nonconducting. When a clamp pulse is applied to the grid of amplifier 23 and a negative-going pulse appears in the plate circuit of amplifier 23, capacitor 34 charges in the proper direction to cause the diodes 28, 29 to conduct. At the same time, the positive-going pulse in the cathode circuit of amplifier 23 results in the capacitor 35 charging in the proper direction to cause diodes 30, 31 to conduct. The diodes 28 through 31, in effect, present a low impedance path between the negative terminal 32 of bias potential and the capacitor 20 whenever the diodes conduct. This action causes the charge on the capacitor 20 to be varied sufficiently to produce a voltage of the proper level for application to the grid of the modulation 18 to render the output of the final R.F. amplifier 14 zero. In other words the clamping circuit acts as a switch. When the diodes 28 through 31 are nonconducting, the modulator 18 will conduct according to the varying voltage developed across the resistor 36 in response to the output wave 53 from the A.C. amplifier 19. When the diodes 28 through 31 are made conducting in response to the application of a clamp pulse to the amplifier 23, the grid of the modulator 18 is clamped to or biased by the negative voltage supplied from a suitable source via terminal 32. The power output then becomes zero.

In the absence of a clamp pulse, capacitors 34, 35 will discharge slowly through resistor 33, keeping the diodes 28 through 31 cut-off or nonconducting. Resistor 33 is of a value such that the time constant of the circuit including capacitors 34, 35 and resistor 33 is longer than the longest possible interval between succeeding clamp pulses. The value of the resistor 33 is chosen so that the capacitors 34, 35 are prevented from discharging to a sufficient level in the interval between succeeding clamp pulses to permit the diodes 28 through 31 to conduct in response to the varying output wave 53 appearing across the capacitor 20. The diodes 28 through 31 are normally held nonconducting by the charge remaining on the capacitors 34, 35. As is customary in the operation of a clamping circuit, the clamp pulses 54, 55 produced by the amplifier 23 are of considerably greater amplitude than the output wave 53 of the A.C. amplifiers 19. In this manner, the diodes 28 through 31 can be made conducting by the charging of the capacitors 35, 34 in response to the simultaneous application of positive and negative clamp pulses, respectively, the charge remaining in the capacitors 34, 35 being at all times sufficient to hold the diodes 28 through 31 insensitive to the output wave 53.

By the use of the clamping circuit including diodes 28 through 31, therefore, an audio frequency wave appears at the grid of the modulator 18 which is an amplified copy of the envelope 52 of the single sideband wave 50. The clamping action will restore the direct current component of the original single sideband wave envelope 52 to the output wave 53 applied from the A.C. amplifiers 19 to the modulator 18 through capacitor 20. The modulator 18 will produce a low output each time a corresponding zero output interval occurs in the single sideband wave 50 produced by the generator 11. The resistor 36 functions to provide the proper bias to the grid of the modulator 18 from the terminal 32 to keep the power output zero during periods of no transmission when there is no output from the generator 11. The resistor 36 should be large enough so that it does not interfere with the clamping action as might otherwise occur due to the charging and discharging of the capacitor 20 through the resistor 36.

The amplified, amplitude modulation component including the varying direct current component is applied from the cathode circuit of the modulator 18 to the junction of the choke 15 and capacitor 16. The cathode of the modulator 18 is always negative with respect to the cathode of amplifier 14, and the audio frequency wave is applied as a varying negative direct current signal voltage in series with the radio frequency excitation present at the grid of the amplifier 14. The phase modulation component applied to the amplifier 14 from the amplifiers 13 will be an amplified copy of the phase modulation component 51 of the single sideband wave 50. The amplitude modulation component applied to the amplifier 14 from the modulator stage 18 will be an amplified copy of the amplitude modulation component 52 of the single side-band wave 50. As is understood in grid-bias modulation, the amplitude modulation component varies the grid bias, which in turn varies the power output of the radio frequency amplifier 14. The average level of the grid bias will be a function of the average amplitude of the amplitude modulation component. If the time relationship between the phase and amplitude modulation components are properly maintained, a high power single sideband wave is obtained at the output of the amplifier 14, which is an amplified copy of the single sideband wave 50 appearing at the output of the generator 11. The amplitude and phase modulation components retain the original phase relationship of the single sideband wave. Under these conditions, sufficient amplitude modulation is effected in the modulated stage 14 to reproduce the form of the original single sideband wave, thus cancelling spurious sidebands introduced when the single sideband wave is divided into its two components. The desired single sideband wave, having the same frequency as the single sideband output wave of the generator 11, may be selected in the resonant circuit 39 by the operation of the variable capacitor 40 and transmitted by means of the antenna 41 to a desired distant location.

While the invention has been described in connection with a two-tone signal, the operation of the invention will be the same should voice or other types of transmission be used. Instead of occurring at regular intervals, as shown in Figure 4 for two-tone transmission, the spikes or intervals of zero output in the single sideband wave will occur at irregular intervals if voice or similar transmission is used. The clamp pulses will be produced at the irregular intervals to cause the operation of the clamping circuit in the manner described. If the average amplitude of the signal energy to be transmitted remains constant over a certain interval of time, say 0.1 second or more, as in a frequency-shifted frequency division multiplex signal, the cancellation of the undesired sidebands in the phase modulated spectrum will take place by means of similar but opposite sideband components produced by the amplitude modulation in the modulated amplifier 14. A proper, amplified copy of the single sideband wave to be transmitted is produced. If, on the other hand, the average amplitude of the amplitude modulation component varies, as in voice transmission, a similar cancellation of the undesired sidebands takes place. This is so because the amplifier 14 is grid modulated by the amplitude modulation component including the average amplitude or direct current component. The average level of the grid bias voltage is a function of the average amplitude of the amplitude modulation component. The undesired sidebands will remain balanced at the output of the modulated amplifier 14. An amplified single sideband wave is produced at the output of the modulated amplifier 14 in which the average amplitude varies in exactly the same manner as does the average amplitude of the original single sideband wave at the output of the generator 11, resulting in the transmission of a proper and desirable signal.

A feature of the invention is the use of circuits which are relatively simple in operation as compared to the circuits used in known systems. As all stages are not critical to adjust, the adjustments necessary to maintain the proper time relationship between the phase and amplitude modulation components can be made without great difficulty. In any system which uses parallel channels for transmission of information, phase coincidence in the channels is of prime importance to avoid the production of high spurious radiations. This requirement is readily met by the invention since both channels can be made sufficiently broadband to permit the undistorted passage of the amplitude and phase modulation components therethrough.

Various modifications may be made to the embodiment of the invention shown in Figure 3 without departing from the spirit thereof. Instead of using the output of the limiters 12 to derive the clamp pulses, a portion of the output of the amplifiers 13 may be fed to the detector 21. In certain applications, the clamp pulses may be derived directly from the output of the generator 11 by using suitable pulse generating and detecting means. While the final clamp pulse amplifier 23 and the clamping circuit including diodes 28 through 31 has been described in connection with inputs and outputs of certain polarity, the circuits may be altered in a known manner to operate in connection with inputs and outputs of different polarity, according to the requirements of a particular application. Instead of the resistor 36, a free-running clamp pulse generator may be used. The clamp pulse generator would be arranged to be shut off by the direct current component of the output of the detector 21 and would be turned on whenever the output of the generator 11 goes to zero and stays there for a certain length of time. The output of the free-running pulse generator would be added to the output of the pulse amplifier 22.

What is claimed is:

1. In a transmitter, means for generating a single sideband wave having phase and amplitude modulation components, said amplitude modulation component having a given average amplitude component according to the modulating signal energy to be transmitted, means for amplifying said phase modulation component, a separate means including an alternating current amplifier for amplifying said amplitude modulation component, means connected between the output of said generating means and the output of said separate means responsive to the envelope of said phase modulation component to cause said amplified amplitude modulation component to include said given average amplitude component, a grid-modulated amplifier stage, means for connecting said first amplifying means to said stage and means for connecting the output of said separate amplifying means to said stage, said stage being responsive to said amplified phase modulation component and to said amplified amplitude modulation component including said given average amplitude component to provide an amplified copy of said single sideband wave.

2. In a transmitter, a source of modulating signal energy to be transmitted, means for producing from said source a complex wave having phase and amplitude modulation components, said amplitude modulation component having a given average amplitude component according to said modulating signal energy, means for amplifying only said phase modulation component, a separate means for amplifying only said amplitude modulation component in such a manner that said average amplitude component is lost, means connected between the output of said producing means and the output of said separate amplifying means responsive to the envelope of said phase modulation component to cause said ampilfied amplitude modulation component to include said given average amplitude component, a grid-bias modulated stage, means for connecting the output of said first amplifying means to said stage and means for connecting the output of said separate amplifying means to said stage, said stage being responsive to said amplified phase modulation component and to said amplified amplitude modulation component including said given average amplitude component to provide an amplified copy of said complex wave.

3. In a transmitter, a source of voice modulating signal energy to be transmitted, means for producing from said source a complex wave having phase and amplitude modulation components, said amplitude modulation component having a varying average amplitude component according to said voice modulating signal energy, means for amplifying only said phase modulation component, a separate means for amplifying only said amplitude modulation component in such a manner that said average amplitude modulation component is lost, clamping means connected between the output of said producing means and the output of said separate amplifying means responsive to the envelope of said phase modulation component to cause said amplified amplitude modulation component to include said varying average amplitude component, a grid-bias modulated stage, means for connecting the output of said first amplifying means to said stage and means for connecting the output of said separate amplifying means to said stage, said stage being responsive to said amplified phase modulation component and to said amplified amplitude modulation component including said varying average amplitude component to provide an amplified copy of said complex wave.

4. In a transmitter, means for generating a single sideband wave having phase and amplitude modulation components, said amplitude modulation component having a given average amplitude according to the modulating signal energy to be transmitted, limiting means connected to said generating means for eliminating amplitude variations from said wave to provide a resultant phase modulated wave, means for amplifying said resultant wave, means connected to said generating means for detecting the amplitude modulation component of said single sideband wave, an alternating current amplifier connected to said detecting means for amplifying said detected amplitude modulation component, clamping means connected between the output of said limiting means and the output of said alternating current amplifier responsive to the envelope of said resultant phase modulated wave to cause said amplified amplitude modulation component to include said given average amplitude component, a grid-bias modulated stage, means for connecting the output of said amplifying means to said stage and means for connecting the output of said alternating current amplifier to said stage, said stage being responsive to said amplified resultant phase modulated wave and to said clamped amplified amplitude modulation component to provide an amplified copy of said single sideband wave.

5. In a transmitter, means for generating a complex wave having phase and amplitude modulation components, said amplitude modulation component having a given average amplitude according to the modulating signal energy to be transmitted, limiting means connected to said generating means for eliminating amplitude variations from said wave to provide a resultant phase modulated wave, means for amplifying said resultant phase modulated wave, means connected to said generating means for detecting the amplitude modulation component of said complex wave, an alternating current amplifier connected to said detecting means for amplifying said detected amplitude modulation component, clamping means connected between said limiting means and the output of said alternating current amplifier responsive to the envelope of said resultant phase modulated wave to cause said amplified amplitude modulation component to include said given average amplitude component, a grid-modulated stage having an input circuit connected to said amplifying means and to said alternating current amplifier to amplitude modulate said amplified resultant phase modulated wave with said clamped amplified amplitude modulation component, whereby a resultant amplified complex wave is produced by said stage representative of the complex wave produced by said generating means.

6. In a transmitter, means for generating a single sideband wave having phase and amplitude modulation components, said amplitude modulation component having a given average amplitude component according to the modulating signal energy to be transmitted, means for amplifying said phase modulation component, a separate means for amplifying said amplitude modulation component, detecting means connected to the output of said generating means and responsive to said single sideband wave to produce a pulse for each interval of zero output of said generating means, clamping means connected between said detecting means and the output of said separate amplifying means responsive to said pulses to cause said separate amplifying means to produce said amplified amplitude modulation component including said given average amplitude component, said amplified amplitude modulation component being made to include by the action of said clamping means an interval of given output corresponding to each interval of zero output in said single sideband wave, a grid-modulated stage, means for connecting said first amplifying means to said stage and means for connecting the output of said separate amplifying means to said stage, said stage being responsive to said amplified phase modulation component and to said clamped amplified amplitude modulation component to provide an amplified single sideband wave output representative of said single sideband wave produced by said generating means.

7. In a transmitter, means for generating a complex wave having phase and amplitude modulation components, said amplitude modulation component having a given average amplitude component according to the modulating signal energy to be transmitted, means for amplifying only said phase modulation component, a separate means including an alternating current amplifier for amplifying only said amplitude modulation component, detecting means connected to said first amplifying means responsive to the envelope of said phase modulation component to produce a pulse for each interval in which said phase modulation component is at a predetermined level, clamping means connected between said detecting means and the output of said separate amplifying means responsive to said pulses to cause said separate amplifying means to produce said amplified amplitude modulation component including spaced intervals of a predetermined level, the spacing of the intervals in said amplified amplitude modulation component corresponding to the spacing of the first-mentioned intervals in said phase modulation component, said amplified amplitude modulation component being made by said clamping means to include said given average amplitude, a grid-modulated stage having an input circuit connected to said first amplifying means and to the output of said separate amplifying means to modulate said amplified phase modulation component with said clamped amplified amplitude modulation component, whereby an amplified complex wave output is provided by said stage representative of said complex wave produced by said generating means.

8. In a transmitter as claimed in claim 7, said clamping means including a plurality of normally inoperative devices each arranged upon being placed in operation to pass current in only one direction, a pulse amplifier connected to said detecting means and responsive to each of said pulses to cause said devices to operate for the duration of the pulse.

9. In a transmitter, a source of voice modulating signal energy, means for generating from said source a complex wave having phase and amplitude modulation components, said amplitude modulation component having a varying average amplitude according to said voice modulating signal energy, means for amplifying only said phase modulation component, a separate means including an alternating current amplifier for amplifying only said amplitude modulation component, a detecting means connected to said first amplifying means and functioning to produce a pulse for each interval of zero output occurring in said phase modulation component, a clamping means connected between said detecting means and the output of said separate amplifying means responsive to said pulses to cause said separate amplifying means to produce said amplified amplitude modulation component including intervals of low output, the intervals of low output in said amplified amplitude modulation component being made by the action of said clamping means to correspond to the intervals of zero output in said phase modulation component, whereby the amplified amplitude modulation component includes said varying average amplitude component, a grid-modulated stage having an input circuit connected to said first amplifying means and to the output of said separate amplifying means, said stage being arranged to modulate said amplified phase modulation component with said clamped amplified amplitude modulation component to produce an amplified copy of said complex waxe.

10. In a transmitter, means for generating a single sideband wave having phase and amplitude modulation components, said amplitude modulation component having a given average amplitude component according to the modulating signal energy to be transmitted, limiting means connected to said generating means for eliminating amplitude variations from said wave to provide a resultant phase modulated wave, means for amplifying said resultant wave, a first detecting means connected to said generating means for detecting the amplitude modulation component of said single sideband wave, an alternating current amplifier connected to said detecting means for amplifying said detected amplitude modulation component, a second detecting means connected to said limiting means and arranged to produce a pulse for each interval of zero output in said resultant wave, a clamping circuit connected between said second detecting means and the output circuit of said alternating current amplifier responsive to said pulses to cause said output circuit to provide said amplified amplitude modulation component including intervals of low output, the intervals of low output in said amplified amplitude modulation component being made by the action of said clamping means to correspond to the intervals of zero output in said resultant wave, whereby said amplified amplitude modulation component includes said given average amplitude component, a grid-modulated stage having an input circuit connected to said amplifying means and to said output circuit of said alternating current amplifier, said stage functioning to modulate said amplified phase modulation component with said clamped amplified amplitude modulation component to produce an amplified copy of said single sideband wave.

11. In a transmitter as claimed in claim 10, said first and said second detecting means each including a half-wave rectifier.

12. In a transmitter as claimed in claim 10, said clamping circuit including a plurality of normally nonconducting rectifiers and a pulse amplifier, said pulse amplifier being connected to said second detecting means and responsive to each of said pulses to cause said rectifiers to conduct, a source of bias potential, said rectifiers functioning upon being made to conduct to complete an electrical path between said output circuit of said alternating current amplifier and said source, said output circuit of said alternating current amplifier being responsive to each completion of said electrical path to cause an interval of low output to occur in said amplified amplitude modulation component.

13. In a transmitter as claimed in claim 12, said output circuit of said alternating current amplifier including a modulator stage and a capacitor connected between said alternating current amplifier and said modulator stage, said clamping circuit being connected to the junction of said capacitor and said modulator stage, each completion of said electrical path serving to vary the voltage developed across said capacitor, whereby said amplified amplitude modulation component including said given average amplitude component appears at the output of said modulator stage for application to said grid-modulated stage.

14. In a transmitter, a source of voice modulating signal energy to be transmitted, means for generating a single sideband wave from said source having phase and amplitude modulation components, said amplitude modulation component having a varying average amplitude component according to said voice modulating signal energy, limiting means connected to said generating means for eliminating amplitude variations from said wave to provide a resultant phase modulated wave, means for amplifying said resultant wave, a first detecting means connected to said generating means for detecting the amplitude modulation component of said single sideband wave, an alternating current amplifier connected to said detecting means for amplifying said detected amplitude modulation component, a second detecting means connected to said limiting means and arranged to produce a pulse for each interval of zero output in said resultant wave, a clamping circuit connected between said second detecting means and the output circuit of said alternating current amplifier responsive to said pulses to cause said output circuit to provide said amplified amplitude modulation component including intervals of low output, the intervals of low output in said amplified amplitude modulation component being made by the action of said clamping means to correspond to the intervals of zero output in said resultant wave, whereby said amplified amplitude modulation component includes said given average amplitude component, a grid-modulated stage having an input circuit connected to said amplifying means and to said output circuit of said alternating current amplifier, said stage functioning to modulate said amplified phase modulation component with said clamped amplified amplitude modulation component to produce an amplified copy of said single sideband wave.

15. In a transmitter, means for generating a single sideband wave having phase and amplitude modulation components, said amplitude modulation component having a given average amplitude component according to the modulating signal energy to be transmitted, limiting means connected to said generating means for eliminating amplitude variations from said wave to provide a resultant phase modulated wave, means for amplifying said resultant wave, a first detecting means connected to said generating means for detecting said amplitude modulation component, an alternating current amplifier connected to said first detecting means for amplifying said amplitude modulation component, a capacitor, a modulator stage operatively connected to said alternating current amplifier through said capacitor, a second detecting means connected to said limiting means and functioning to produce a pulse for each interval of zero output in said resultant wave, a clamping circuit connected between said second detecting means and the junction of said capacitor and said modulator stage, said clamping circuit being responsive to each of said pulses to alter the voltage developed across said capacitor, whereby the amplified amplitude modulation component appearing at the output of said modulator stage includes said average amplitude component, a grid-modulated stage having an input circuit connected to said amplifying means and to said modulator stage, said grid-modulated stage functioning to modulate said amplified resultant phase modulated wave with said clamped amplified amplitude modulation component to produce an amplified copy of said single sideband wave.

16. In a transmitter as claimed in claim 15, said clamping circuit including a plurality of unidirectional current conducting devices arranged to be normally nonconducting and a pulse amplifier, said pulse amplifier being connected to said second detecting means and responsive to each of said pulses to cause said devices to conduct, a source of bias potential, said devices functioning upon being made to conduct to complete an electrical path between said junction and said source, whereby the voltage developed across said capacitor at the time of the clamping action is altered according to the bias potential supplied from said source.

17. A method comprising the steps of producing a suppressed carrier single sideband wave having phase and amplitude modulation components, amplifying said phase and amplitude modulation components over separate channels, clamping the amplified amplitude modulation component to a predetermined level each time a corresponding interval of zero output occurs in said wave, and recombining said amplified phase modulation component and said clamped amplified amplitude modulation component to form an amplified single sideband wave representative of said first wave.

18. A method of producing a single sideband wave from a suppressed carrier input wave having phase and amplitude modulation components, which comprises amplifying said phase and amplitude modulation components over separate channels, clamping the amplified amplitude modulation component to a predetermined level each time a corresponding interval of zero output occurs in said input wave, and recombining said amplified phase modulation component and said clamped amplified amplitude modulation component to form an amplified single sideband wave representative of said input wave.

19. In a transmitter, means for generating a single sideband wave having phase and amplitude modulation components, said amplitude modulation component having an average amplitude component, limiting means connected to said generating means for eliminating amplitude variations from said wave to provide said phase modulation component, means connected to said limiting means for amplifying said phase modulation component, means connected to said generating means for detecting the amplitude modulation component of said single sideband wave, an alternating current amplifier connected to said detecting means for amplifying said detected amplitude modulation component, clamping means connected between the output of said limiting means and the output of said alternating current amplifier responsive to the envelope of said phase modulation component to cause said amplified amplitude modulation component to include said average amplitude component, an output amplifier, means for connecting the output of said amplifying means and the output of said alternating current amplifier to said output amplifier so that said amplified phase modulation component is modulated by said clamped amplified amplitude modulation component in said output amplifier to produce an amplified copy of said single sideband wave.

20. In a transmitter, means for generating a single sideband wave having phase and amplitude modulation components, said amplitude modulation component having an average amplitude component, limiting means connected to said generating means for eliminating amplitude variations from said wave to provide said phase modulation component, means connected to said limiting means for amplifying said phase modulation component, a first detecting means connected to said generating means for detecting the amplitude modulation component of said single sideband wave, an alternating current amplifier connected to said detecting means for amplifying said detected amplitude modulation component, a second detecting means connected to said limiting means and arranged to produce a pulse for each interval of zero output in said phase modulation component, a clamping circuit connected between said second detecting means and the output circuit of said alternating current amplifier responsive to said pulses to cause the amplified amplitude modulation component including intervals of low output to be produced in said output circuit, the intervals of low output in said amplified amplitude modulation component being made by the action of said clamping circuit to correspond to the intervals of zero output in said phase modulation component, whereby said amplified amplitude modulation component includes said average amplitude component, an output amplifier having an input circuit connected to said amplifying means and to said output circuit of said alternating current amplifier so that said output amplifier functions to modulate said amplified phase modulation component with said clamped amplified amplitude modulation component to produce an amplified copy of said single sideband wave.

21. In combination, means responsive to a complex wave having a phase and an amplitude modulation component including a given average amplitude component for amplifying only said phase modulation component, a separate means including an alternating current amplifier responsive to said complex wave for amplifying only said amplitude modulation component, detecting means connected to said first amplifying means responsive to the envelope of said phase modulation component to produce a pulse for each interval in which said phase modulation component is at a predetermined level, clamping means connected between said detecting means and the output of said separate amplifying means and responsive to said pulses to alter the output of said separate amplifying means to include said amplified amplitude modulation component but having spaced intervals of a predetermined level, the spacing of the intervals in said amplified amplitude modulation component corresponding to the spacing of the first-mentioned intervals in said phase modulation component, whereby said clamping means introduces said average amplitude component into said amplified amplitude modulation component, an output amplifier, means for connecting the output of said first-mentioned amplifying means and the output of said separate amplifying means to said output amplifier to cause said amplified phase modulation component to be modulated by said amplified amplitude modulation component including said average amplitude component, whereby an amplified copy of said complex wave appears at the output of said output amplifier.

22. An amplifying arrangement comprising, in combination, limiting means responsive to a complex wave having a phase and an amplitude modulation component including a given average amplitude component for eliminating amplitude variations from said wave to produce said phase modulation component, means for amplifying said phase modulation component, means responsive to said complex wave for detecting said amplitude modulation component, an alternating current amplifier connected to said detecting means for amplifying said detected amplitude modulation component, clamping means connected between the output of said limiting means and the output of said alternating current amplifier responsive to the envelope of said phase modulation component to cause the amplified amplitude modulation component at the output of said alternating current amplifier to include said average amplitude component, an output amplifier, means to connect the output of said amplifying means and the output of said alternating current amplifier to said output amplifier so that said amplified phase modulation component is modulated by said amplified amplitude modulation component including said average amplitude component to produce an amplified copy of said complex wave.

23. In combination, limiting means responsive to a complex wave having a phase and an amplitude modulation component including a given average amplitude component for eliminating amplitude variations from said wave to produce said phase modulation component, detecting means responsive to said complex wave to produce said amplitude modulation component, a second detecting means connected to the output of said limiting means responsive to said phase modulation component for producing a pulse for each interval in which said phase modulation component is at a predetermined level, means connected to the outputs of said first and second detecting means responsive to said pulses and to said amplitude modulation component for amplifying said amplitude modulation component including said average amplitude component, means connected to the output of said limiting means for amplifying said phase modulation component, an output amplifier, means to apply said amplified amplitude modulation component from said first-mentioned amplifying means to said output amplifier and means to apply said amplified phase modulation component from said second-mentioned amplifying means to said output amplifier, said output amplifier producing an amplified copy of said complex wave.

24. In a system for amplifying a complex wave having a phase modulation component and an amplitude modulation component including a given average amplitude component, limiting means responsive to said complex wave for eliminating amplitude variations from said wave to produce said phase modulation component, detecting means responsive to said complex wave to produce said amplitude modulation component, a second detecting means connected to the output of said limiting means responsive to said phase modulation component for producing a pulse for each interval in which said phase modulation component is at a predetermined level, and means connected to the outputs of said first and second detecting means responsive to said pulses and to said amplitude modulation component for amplifying said amplitude modulation component including said average amplitude component.

25. In a system for amplifying a complex wave having a phase modulation component and an amplitude modulation component including an average amplitude component, limiting means responsive to said complex wave for eliminating amplitude variations from said wave to provide said phase modulation component, detecting means responsive to said complex wave to provide said amplitude modulation component, a second detecting means responsive to the phase modulation component of said complex wave for providing a pulse for each interval in which said phase modulation component is at a predetermined level, means coupled to the outputs of said first and second detecting means responsive to said pulses and to said amplitude modulation component for amplifying said amplitude modulation component including said average amplitude component, means coupled to said limiting means for amplifying said phase modulation component, and means coupled to both of said amplifying means to modulate said amplified phase modulation component with said amplified amplitude modulation component including said average amplitude component.

References Cited in the file of this patent

UNITED STATES PATENTS

| | | |
|---|---|---|
| 2,076,787 | Laport | Apr. 13, 1937 |
| 2,666,133 | Kahn | Jan. 12, 1954 |